June 24, 1952 R. L. DAUGHERTY 2,601,264
TIME CONTROL SYSTEM AND APPARATUS
Filed April 2, 1949 3 Sheets-Sheet 2

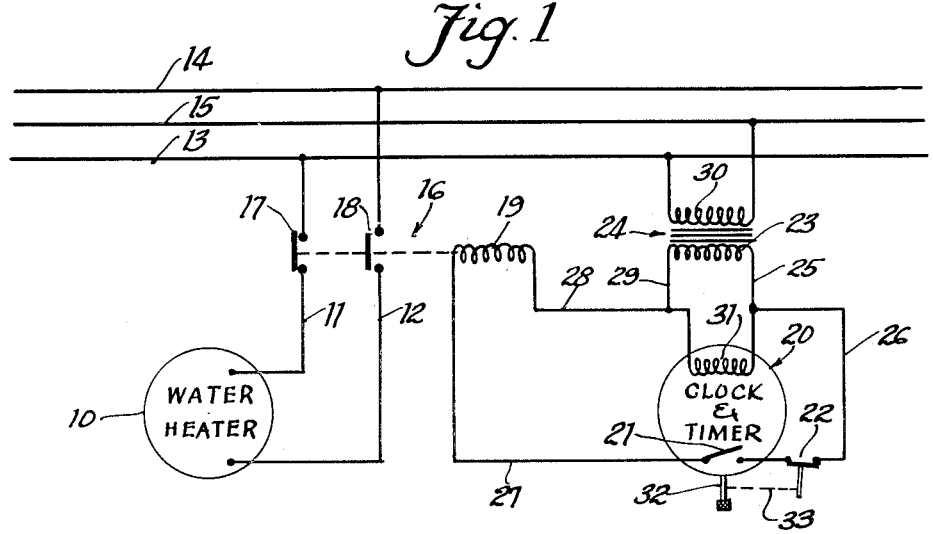
Fig. 1
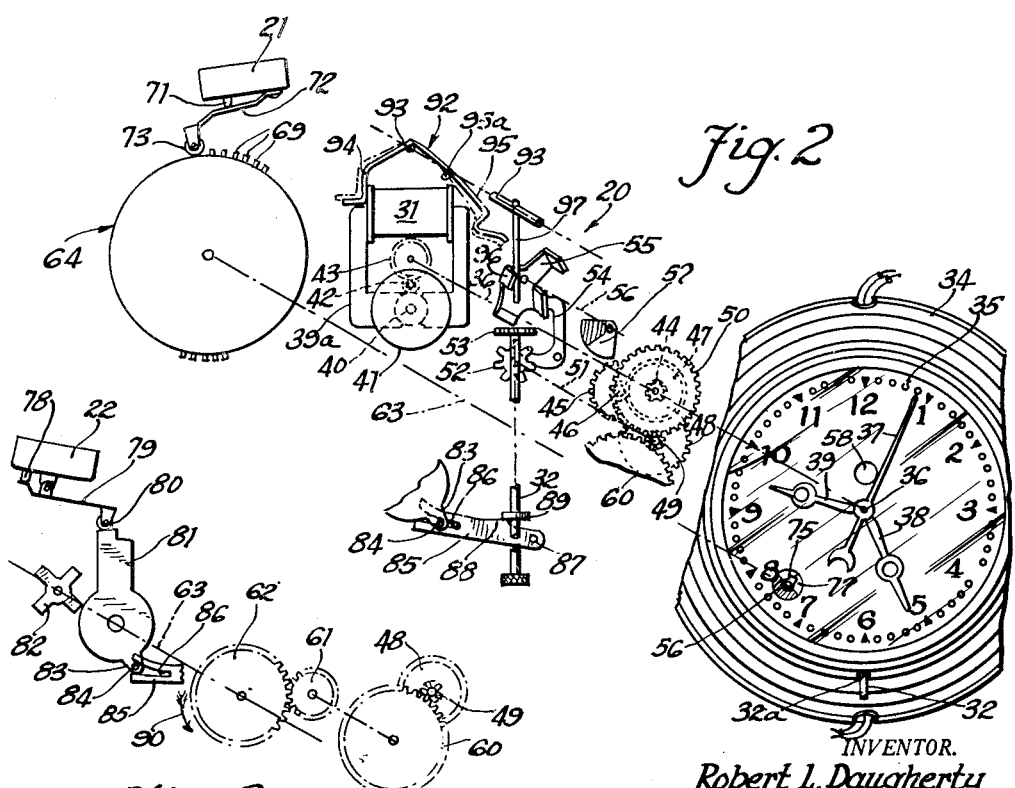
Fig. 2
Fig. 2A
INVENTOR.
Robert L. Daugherty

INVENTOR.
Robert L. Daugherty
BY
Mason, Kolehmainen, Rathburn & Wyss
Att'ys

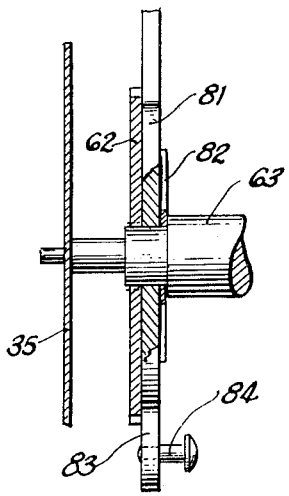
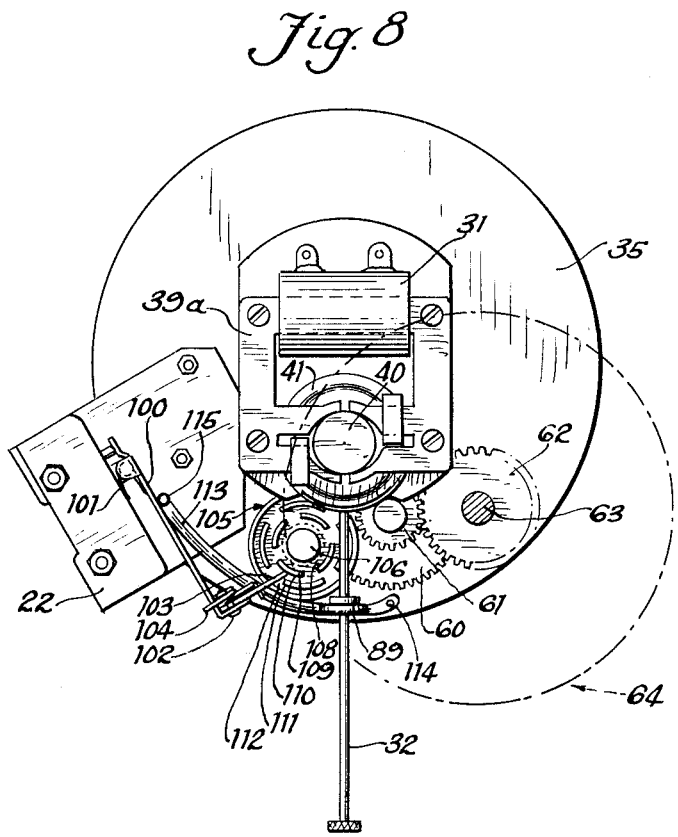
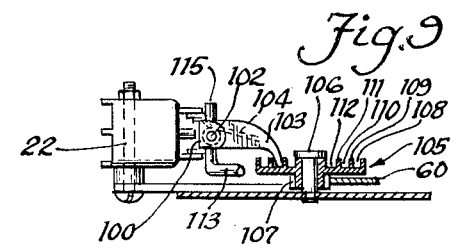

UNITED STATES PATENT OFFICE 2,601,264

TIME CONTROL SYSTEM AND APPARATUS

Robert L. Daugherty, Madison, Wis., assignor to Hankscraft Company, Reedsburg, Wis., a corporation of Wisconsin Application April 2, 1949, Serial No. 85,097

17 Claims. (Cl. 161—1)

This invention relates to time controlled systems and apparatus, more particularly to off-peak load control systems for electric load circuits, and the invention has for an object the provision of improved systems and apparatus of this character which are inexpensive to construct and install, which operate efficiently and accurately, and which require a minimum of service and repair.

The economic advantages of so-called off-peak control for certain types of electric load circuits, whereby these circuits may be energized only during periods when the total power demand on a distribution system is low, have long been recognized. The extension of electrification to rural communities and farms and the use of electricity in such localities for storage type loads such as electric water heaters, tank heaters, motor driven deep well pumps and the like, have accentuated the problem, since it is highly desirable that such storage type loads, i. e. loads capable of storing energy in the form of heat or waterhead, shall be imposed on the power system only during periods of minimum demand, while at the same time a maximum amount of stored energy should be provided at the times when such energy is in demand.

In attempts to meet this problem, various types of time controlled off-peak control devices have been provided for setting up certain hours during the day and night in which storage type load devices are disconnected from the power system and cannot be energized. Such prior devices, however, have been of complicated and expensive construction and have required trained and skilled personnel for proper adjustment of the device to the exact switching hours desired. Furthermore, time correction and time adjustment of such devices following power outages have required a visit to the premises of the user by service crews and, in fact, the maintenance and adjustment costs have been found to be such as to render these prior devices feasible only in special installations and in connection with readily accessible user-premises.

Much is yet to be desired, therefore, in control systems and apparatus of this character, and it is accordingly a further object of the invention to provide time controlled systems and apparatus that are not only of simple and inexpensive construction but are also particularly adapted for off-peak load control, and which may be quickly installed by the customer or power user, may be promptly corrected by the user for proper time control after each power outage, and which include means for automatically penalizing the user whenever an attempt is made to adjust the device for energization of the storage load circuits during periods other than those set by the power company.

It is a further object of the invention to provide an off-peak load control system which incorporates in an ordinary electrically driven manually resettable clock, such, for example, as a kitchen clock, suitable timing and control mechanism arranged to be resettable with the clock after each stoppage, whereby the user, merely by keeping the clock properly set, may insure a proper time cycle to supply predetermined amounts of hot water or other stored energy.

A further object of the invention is the provision in an off-peak load control system of this character of visible means for indicating to the user whether the 12-hour indicated time of the clock corresponds to the proper day or night setting of the timing mechanism.

A still further object of the invention is the provision in such clock controlled and resettable mechanism of anti-cheat means for penalizing the user in the event that an attempt is made to set the clock improperly for the purpose of energizing the storage load during restricted periods.

Another object of the invention is the provision in such clock controlled and resettable mechanism of an alarm device for automatically warning the user of the necessity for resetting the clock whenever electric service is restored after a power outage.

In carrying out the invention in one form, off-peak control of an electric load circuit is provided by combining with a conventional electrically driven and manually resettable clock a preset timing mechanism in the form of additional gear means within the clock casing which provide, in conjunction with the clock, a synchronously driven and simultaneously resettable 24-hour gear train. The timing mechanism is arranged to operate suitable switch means at selected intervals during each 24-hour cycle to energize or deenergize the load circuit, and means are provided visible on the clock face and driven synchronously with the timing mechanism for indicating whether or not the clock is set to the proper 12-hour day-night cycle with respect to the 24-hour timing mechanism.

In accordance with a further aspect of the invention, the control device is provided with anti-cheat means operable each time that the reset member of the clock is actuated for preventing energization of the load circuit for a predetermined time after each resetting operation, whereby attempts to effect energization of the load circuit during normally restricted periods by improper setting of the clock will be prevented and the user penalized by the imposition of an additional non-use period. If desired, automatic audible alarm means, in addition to the visible means ordinarily incorporated in conventional clocks to warn the user that there has been a power outage, may be incorporated in the control device and arranged to give an audible signal on resumption of electric service, which signal will continue until the clock and timing mechanism are reset.

The invention, both as to its organization and method of operation, together with further objects and advantages thereof, will best be understood by reference to the specification taken in connection with the accompanying drawing, in which:

Fig. 1 is a circuit diagram illustrating one type of off-peak control system embodying the present invention;

Fig. 2 is a diagrammatic exploded view of a conventional clock incorporating time control mechanism embodying the present invention;

Fig. 2a is a fragmentary view similar to Fig. 2 and showing a portion of the mechanism omitted from Fig. 2;

Fig. 7 is an enlarged detail view partially in section showing a portion of the anti-cheat means incorporated in the device of Figs. 2 to 4, inclusive;

Fig. 8 is a view similar to Fig. 3 showing a device embodying the present invention, provided with a somewhat different type of anti-cheat means; and Fig. 9 is a fragmentary sectional view of the anti-cheat means shown in Fig. 8.

Figure 5:
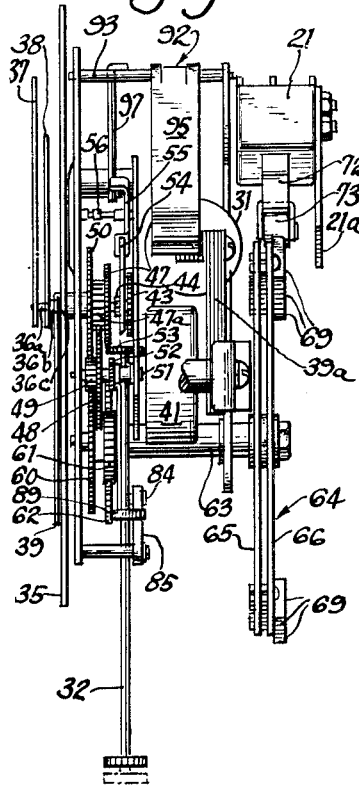
Fig. 5 is a side elevational view of the mechanism shown in Fig. 4.

Referring now to the drawings, the invention is diagrammatically illustrated in Fig. 1 as embodied in an off-peak load control system for a storage type load, comprising, for example, an electrically heated water heater 10, adapted to be energized through suitable leads 11 and 12 from a source of alternating current energy represented by the conductors 13, 14 and 15, constituting a conventional 110–220 volt, 3 wire circuit, the heater being connected as shown for energization at 220 volts. In order to effect energization and deenergization of the water heater 10, a suitable relay 16 is provided having contacts 17 and 18 connected in the heater leads 11 and 12 and adapted for operation between open and closed circuit positions by an operating winding 19. Although the relay 16 is shown as being of the double pole type, it will, of course, be understood that a single pole relay may be employed having its contacts connected in one or the other of the heater leads 11 and 12.

Energization and deenergization of the relay 16, in order to effect closure and opening of the relay contacts, is under the control of a timing device embodying the present invention comprising a clock and timer mechanism 20 which is arranged, as more fully explained hereinafter, to open and close at predetermined intervals a suitable control switch 21, the contacts of which are connected in series with a so-called anti-cheat switch 22, as will be more fully explained hereinafter. The energizing circuit for the relay winding 19 thus may be traced from one terminal of the secondary winding 23 of a suitable step down transformer 24, through conductors 25 and 26, the switches 22 and 21, a conductor 27, the relay winding 19, and conductors 28 and 29, to the other terminal of the secondary winding. As shown, the transformer 24 includes a primary winding 30 which may be connected across the conductors 13 and 15 of the source of energy for energization therefrom. The timing mechanism 20, as will be more fully explained hereinafter, is of the electrically driven manually resettable type and includes a self-starting synchronous motor having a winding 31 adapted to be energized as shown from the secondary winding 23 of the transformer 24. It will be understood that the particular circuit connections shown in Fig. 1 of the drawings are illustrative only and are adapted for use where the relay and clock are of the low voltage type adapted for energization at a voltage in the neighborhood of 24 volts, for example. Where either the relay or the clock motor are designed for operation at 110 volts, the circuit may be modified to provide for energization of the higher voltage device directly from the source of energy, or where both are intended for high voltage operation, the transformer 24 may be dispensed with and the leads 25 and 29 connected directly across the conductors 13 and 15, for example, of the source of energy.

While the anti-cheat switch 22 has been shown for purposes of simplicity in Fig. 1 as separate from the clock and timer mechanism 20, it will be understood from the following description that the anti-cheat switch 22 is incorporated in the clock and timer mechanism and arranged for operation by the resetting member 32, as indicated diagrammatically by the broken line 33 in Fig. 1. Before describing in detail the operation of the off-peak control system illustrated diagrammatically in Fig. 1, reference will first be had to Figs. 2 to 6, inclusive, of the drawing, wherein the structural details of a preferred physical embodiment of the invention are shown.

As shown in Fig. 2, the clock and timer 20 includes a conventional electrically driven manually resettable clock having a casing 34 in the front wall of which there is disposed, behind the usual transparent window or crystal, a 12-hour face or dial 35, through which extend suitable driving shafts 36 for effecting timed movement of a second hand 37, a minute hand 38 and an hour hand 39. Operation of the clock hands is effected by a suitable self-starting synchronous motor having a stator frame 39a, on which is disposed the winding 31, and a rotor 40, arranged to drive suitable gear reduction mechanism contained within a housing 41. The output shaft of the gear reduction mechanism is provided with a pinion 42 which drives a second-hand gear 43 mounted on the inner one of the driving shafts 36. In accordance with conventional practice, and as shown best in Fig. 5, the plural shaft arrangement 36 comprises an inner shaft 36a for driving the second hand 37, a coaxial tubular shaft 36b for driving the minute hand 38, and an outer tubular shaft 36c for driving the hour hand 39, and in Fig. 2 the three coaxial shafts are represented by the broken line identified generally by the reference numeral 36. The second hand shaft 36a, in accordance with conventional practice, carries a pinion 44 which meshes with a gear 45, which carries on its shaft a second pinion 46 arranged to drive a minute-hand gear 47, which, through a suitable friction clutch (not shown), drives a second minute-hand gear 47a (Fig. 5) secured to the tubular shaft 36b, on which the minute hand of the clock is carried. Meshing with the friction clutch gear 47a is a further gear 48, which, through a suitable pinion 49, drives the hour-hand gear 50, which is mounted on the outer tubular shaft 36c on which the hour hand 39 is carried.

In accordance with conventional practice, the previously referred to pinion 49 is mounted on a resetting shaft 51 which carries a resetting pinion 52 adapted to be engaged by a second pinion 53, which is carried on the resetting member 32 and is normally held out of mesh with the pinion 52. In order to reset the minute and hour hands of the clock it is necessary only to move the resetting member 32 downwardly to engage the pinions 52 and 53, whereupon rotation of the resetting member 32 will cause rotation of all of the gears and pinions in the gear train, back as far as the friction clutch between gears 47 and 47a, thereby to reset the minute and hour hands of the clock.

Also forming a part of the conventional clock mechanism embodied in the clock and timer 20 is a pivoted bell crank lever 54 which, through a second pivoted lever 55 is adapted to rotate a shaft 56 carrying a suitably colored flag 57 which cooperates with an aperture 58 in the clock face 35 to provide a visual indication whenever a temporary power outage has resulted in stoppage of the clock, as will be understood by those skilled in the art.

The clock mechanism thus far described provides a 12-hour gear train for operating the hour hand 39 of the clock and in accordance with the present invention, additional gear means comprising a gear 60, a pinion 61 and a second gear 62 is arranged, with the gear 60 meshing with the pinion 49, to provide, in conjunction with the 12-hour gear train of the clock, a 24-hour gear train for driving a timing shaft 63 through one revolution each 24 hours. Since the pinion 49 with which the gear 60 meshes is secured to the resetting shaft 51 of the clock mechanism, it will be apparent that the 24-hour gear train and the timing shaft 63 are not only driven synchronously with the clock mechanism, but are likewise simultaneously manually resettable through operation of the resetting member 32.

Figure 6:
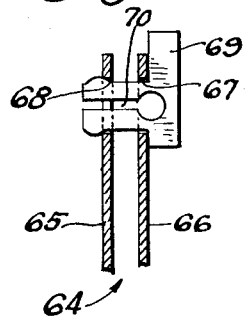
Fig. 6 is a fragmentary sectional detail view taken along the line 6—6 of Fig. 4.

Mounted on one end of the timing shaft 63 for rotation thereby through a 24-hour cycle, is a timing member 64, which preferably comprises a pair of spaced disks 65 and 66 which are secured together and provided adjacent their outer peripheries with alined slots 67 and 68 for receiving suitable L-shaped timing segments 69, which, as shown in Fig. 6, are provided with suitable slots 70, whereby the segments 69 may be readily inserted into or removed from the apertures 67 and 68 and will be resiliently retained therein. Suitably mounted on a portion of the framework of the clock mechanism is the switch 21, which may be of any suitable type available on the market, but is shown as comprising a well known type of normally closed manually operable switch having an operating member 71 adapted to be depressed to cause opening of the switch contacts. Associated with the switch 21 is a follower arm 72 which carries at its outer end a roller 73 adapted to ride on the periphery of the timing member 64 and to be engaged by the segments 69 which extend outwardly beyond the periphery of the timing member 64.

As will be more fully explained hereinafter, when any one of the timing segments 69 engages the roller 73, the follower arm 72 will be moved to depress the switch operator 71, thereby opening the contacts of the switch 21, and the arrangement of the apertures 67 and 68 in the timing disks 65 and 66 is such that each segment 69 provides a 15 minute period during which the switch 21 is maintained open.

The end of the timing shaft 63, opposite from the timing member 64 extends through the face 35 of the clock and carries a suitable pointer 75 arranged to cooperate with a dial 77 formed in the face of the clock and separated, as by contrasting colors, into day-night portions. Thus, whenever the minute and hour hands 38 and 39 of the clock are reset by manipulation of the resetting member 32, the pointer 75 indicates to which 12-hour period, i. e. day or night, the clock is set with respect to the 24-hour timing mechanism operated by the timing shaft 63.

Figure 4:
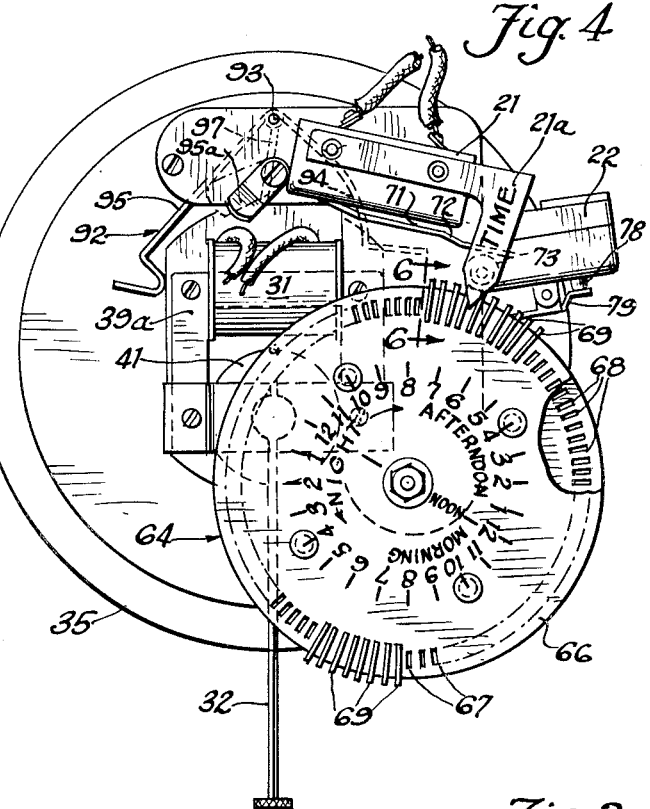
Fig. 4 is a rear elevational view similar to Fig. 3, illustrating certain of the parts omitted in Fig. 3.

As previously indicated, all of the clock and timing mechanism shown in Fig. 2 is contained within the clock casing 34, with the resetting member 32 being extended through a suitable aperture 32a in the clock casing so that only the clock hands and the day-night dial and indicator 75, 77 are visible, and only the resetting member 32 is available for manipulation. Preferably the clock case 34 is provided with a removable rear wall (not shown), and before this rear wall is fastened in place, the timing mechanism may be adjusted to provide for on-and-off operation of the switch 21 at the desired time intervals. As shown in Fig. 4, the timing disk 66 is preferably provided for convenience with suitable indicia indicating the various hours of the day and night and the presence or absence of the timing segments 69 indicates whether or not the switch 21 will be opened or closed. A suitable pointer 21a mounted on the switch 21 cooperates with the indicia on the disk 66 to indicate the time setting of the disks 65 and 66 which, of course, must correspond to the time setting of the clock hands. In Fig. 4 the timing segments 69 are shown as arranged to insure that the water heater will not be energized during the period extending from 5:15 p. m. to 7:45 p. m. and during the period extending from 6:00 a. m. to 8:00 a. m. After the segments have been properly arranged in the timing disk, the clock casing may be closed and sealed, and thereafter accurate timing of the on-and-off periods of the water heater will be obtained so long as the clock mechanism is set to indicate the proper time.

It will now be apparent that after the clock and timing mechanism have been properly assembled and connected in circuit with the relay 16, as shown in Fig. 1, the switch 21 will remain closed so long as no timing segment 69 is in position to operate the follower arm 72 to open the switch 21, and consequently the water heater will be energized. Whenever a timing segment 69 is in position to open the switch 21, the relay 16 will be deenergized to open its contacts 17 and 18 and, in order to insure that the time cycle will always be properly carried out, it is only necessary for the user to reset the clock each time a power outage or service failure occurs so that a stoppage of the clock is caused. Resetting of the clock through manipulation of the reset member 32, synchronously and simultaneously resets the time mechanism and the day-night indicator insures that the user will be informed that the clock hands, which indicate only a 12-hour time cycle, are set to the proper 12-hour cycle with respect to the 24-hour cycle of the timing mechanism. Accordingly, timed operations intended to be carried out in the daytime will not inadvertently occur during the night hours.

It may happen that the user, for reasons of his own, may desire to energize his water heater during normally restricted periods in violation of his contract with the power company, and in attempting to carry out this improper purpose, the user may either during or just prior to a restricted period set the clock back in order to provide additional on-time, or may set the clock forward in order to pass quickly over the off-power period. In order to prevent such improper operation, the timing mechanism is provided, in accordance with the present invention, with the anti-cheat switch 22 and with suitable operating means therefor which are automatically rendered effective whenever the reset member 32 of the clock is operated.

Figure 3:
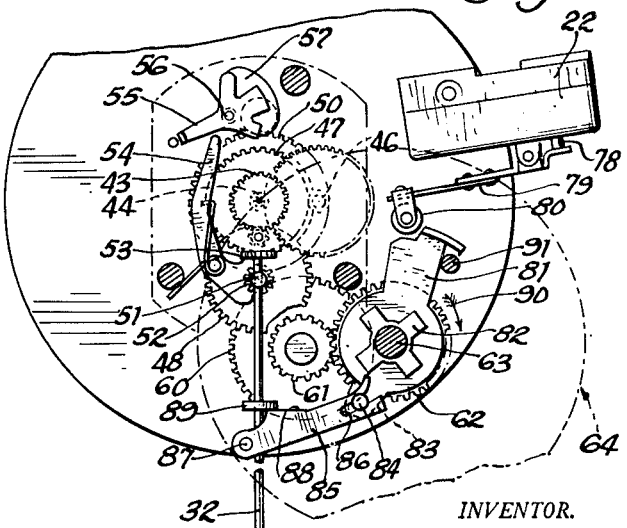
Fig. 3 is a rear elevational view of the device shown in Fig. 2, certain parts being omitted or shown in phantom in order more clearly to illustrate the construction.

As shown in Figs. 2, 2a and 3, the anti-cheat switch 22, which is normally open, and includes a depressible operating member 78, is provided with an operating arm 79 which is biased by a suitable spring (not shown) so as to depress the member 78 (Fig. 3) and maintain the switch 22 in closed position. The arm 79 carries a roller or follower 80 adapted to be engaged by a cam arm 81 which is rotatably mounted on the timing shaft 63 in face-to-face engagement with the gear 62 and frictionally held in contact with the gear 62 by a suitable spring member 82. Formed integrally with the cam arm 81 is a second arm 83 which carries a projecting pin 84 adapted to be engaged by a pivoted finger member 85 having a suitably shaped slot 86 within which the pin 84 is received. As shown best in Figs. 2 and 3, the arm 85, which is pivoted on a suitable pin 87, is provided with a shoulder portion 88 adapted to be engaged by a projection 89 on the reset member 32.

Normally the anti-cheat switch 22 and associated mechanism occupy the positions shown in Fig. 3, wherein the arm 79 maintains the switch operating member 72 in a position to close the switch 22. Whenever the reset member 32 is operated to effect a resetting of the clock, the projection 89 on the member 32 engages the shoulder 88 on the finger 85 so as to move the outer end of the finger 85 downwardly as viewed in Fig. 3, thereby to exert a camming action on the pin 84 so as to rotate the cam arm 81 from the position shown in Fig. 3 to the position shown in Fig. 2a, thereby raising the roller 80 and operating the arm 79 so as to permit opening movement of the anti-cheat switch 22. Thus, the energizing circuit for the relay winding 19 will be opened each time the clock mechanism is reset so that following completion of the resetting operation the relay 16 will be maintained deenergized even though the timing disk 65 has been moved to a position permitting closure of the time operated switch 21.

Movement of the arm 81 by the arm 85 to open the anti-cheat switch 22 causes relative movement between the arm 81 and the gear 62 which is permitted by the frictional connection therebetween. Rotation of the reset member 32 in a direction to set the clock ahead will cause the gear 62 to rotate in the direction of the arrows 90 but the arm 81 will be held against movement by the cam portion of the arm 85. Rotation of the reset member 32 in a direction to set the clock back will cause rotation of the gear 82 in the opposite direction but corresponding movement of the arm 81 is prevented by a suitable stop 91 (Fig. 3). As soon as the resetting member 32 is released, however, rotation of the gear 62 by the clock mechanism in the direction indicated by the arrows 90 in Figs. 2a and 3, will drive the arm 81 in a corresponding direction from the position shown in Fig. 2a to the position shown in Fig. 3, so as to permit reclosure of the anti-cheat switch 22 after the elapse of a predetermined time.

Although, as previously indicated and in accordance with conventional practice, the flag or signal 57 will move with respect to the aperture 58 in the clock face 35 so as to give a visual indication of any power failure and clock stoppage, thereby warning the user of the necessity of resetting the clock after service has been restored, it may be desirable in some cases to provide an audible warning which will forcibly call to the attention of the user the necessity for resetting the clock. Accordingly it may in some cases be desirable to provide an audible mechanism which, in accordance with the present invention, may constitute a vibrating member 92 (Fig. 4) mounted on a rotatable shaft 93 and having end portions 94 and 95 disposed in the vicinity of the magnetic frame 39a of the clock motor. Whenever a power interruption occurs, the vibrator 92 will move by gravity to the position indicated by broken lines in Fig. 2, so that the end portion 95 is in close proximity to the stator frame 39a, a suitable adjustable stop 95a being provided for positioning the end portion 95. As soon as power is restored, therefore, the alternating magnetic field set up in the stator frame 39a causes the member 92 to vibrate with a buzzer-like action, thus creating an audible signal which will continue until such time as the clock is reset.

When the resetting member 32 of the clock mechanism is operated to effect a resetting operation, the arm 54 will effect movement of the pivoted member 55, as heretofore indicated, and, as shown in Fig. 2, the member 55 is provided with an extending arm 96 which is arranged to engage a finger 97 carried by the shaft 93 so as to rotate the shaft 93 in a direction to move the vibrator member 92 to the heavy line position shown in Fig. 2, wherein the end portion 94 is in close proximity to the stator frame 39a and is sufficiently disposed in the magnetic field thereof to maintain the vibrator member 92 in the heavy line position so long as the clock motor is energized. In the heavy line position of Fig. 2, the end portion 94 of the vibrator engages a non-magnetic member, such, for example, as the end of the winding 21, and consequently no audible buzzer action occurs. Thus, resetting of the clock mechanism following a restoration of service will automatically terminate the audible alarm provided by the vibrator member 92.

In Figs. 8 and 9 a second type of anti-cheat device is shown which may be employed in connection with the clock and timing mechanism of the present invention and which comprises a normally open anti-cheat switch 22, as in the previous embodiment, arranged for operation to closed position by a pivoted arm 100 which is suitably biased by a spring 101. The arm 100 carries at its free end a suitable pivot pin 102, on which is mounted a follower finger 103 biased by a spring 104 so as to engage the face of a rotatable disk 105 mounted on a pin 106 and including an integrally formed pinion 107 (Fig. 9) adapted to mesh with the previously referred to gear 60 of the 24-hour gear train. As shown, the disk 105 has formed on one face thereof an inner groove 108 separated by an interrupted wall 109 from an adjacent groove 110 which is in turn separated by a second interrupted wall 111 from an outer groove 112.

During normal operation of the timing and clock mechanism, the follower finger 103 is disposed in the inner groove 108 and is maintained therein by the spring 101 and the arm 100, so that the arm 100 holds the switch 22 in its closed position. However, whenever the reset member 32 is actuated to effect a resetting operation, the projection 89 thereon engages a suitable lever 113, which is pivoted at 114, so that the free end portion 115 thereof, upon downward movement of the reset member 32, will operate the arm 100 against the force of the spring 101 and thereby permit the switch 22 to open.

Movement of the arm 100 by the lever 113 causes the follower finger 103 to move outwardly of the disk 105, the shape of the finger 103 and the resilience provided by the spring 104 permitting the finger to ride over the walls 109 and 111, so that the follower finger comes to rest in the outer groove 112. Thus, when the reset member 32 is released to terminate the resetting operation, the finger 103 engages either a segment of the outer wall 111 or a segment of the inner wall 109, depending upon the relative position of the disk 105, temporarily to prevent the arm 100 from reclosing the switch 22.

Following the resetting operation, the disk 105 is rotated due to engagement of the pinion 107 with the gears 60, and the follower finger 103, assuming that it is in the outer groove 112, will, as soon as it encounters one of the interruptions in the wall 111, move inwardly until arrested in the groove 110 by the inner wall 109, and upon further rotation of the disk 105, the finger 103, when it encounters an interruption in the wall 109, will move into the inner groove 108, thereby permitting the arm 100 to reclose the switch 22. By providing a pair of interrupted walls defining a plurality of grooves, it is possible to insure that the disk 105 cannot be moved during a resetting operation to a position in which the finger 103 will immediately return to the inner groove upon release of the reset member 32. However, in this embodiment of the invention, the anti-cheat switch will be held open for variable lengths of time depending upon the position occupied by the disk 105 at the end of a resetting operation. In the previously described embodiment, the time during which the anti-cheat switch is maintained open is a fixed value, since movement of the resetting member 32 is effective to move the cam arm 81 to a definite position from which it is returned at a constant rate by frictional engagement with the gear 62.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. In a control system for an electric load circuit, the combination with a conventional electrically driven manually resettable clock, of gear means driven by said clock and forming in conjunction therewith a synchronously driven and simultaneously resettable 24-hour gear train, and switch means operable between on and off positions for controlling said load circuit and timing mechanism driven by said 24-hour gear train including a plurality of adjustable portions for operating said switch means between said on-position and off-position at a plurality of selected variable intervals during each 24-hour cycle.

2. In an off-peak control system for an electric load circuit, the combination with a conventional electrically driven manually resettable clock, of gear means driven by said clock and forming in conjunction therewith a synchronously driven and simultaneously resettable 24-hour gear train, timing mechanism driven by said 24-hour gear train including switch means operable between on-position and off-position at selected intervals during each 24-hour cycle for controlling said load circuit, and means effective upon each resetting of said clock and said gear train for preventing energization of said load circuit by operation of said switch means for a predetermined time interval following said resetting.

3. In an off-peak control system for an electric load circuit, the combination with a conventional electrically driven manually resettable clock, of gear means driven by said clock and forming in conjunction therewith a synchronously driven and simultaneously resettable 24-hour gear train, timing mechanism driven by said 24-hour gear train including switch means operable between on-position and off-position at selected intervals during each 24-hour cycle for controlling said load circuit normally closed switch means connected in series with said first mentioned switch means, means responsive to resetting of said clock and gear train for opening said normally closed switch means to render said first switch means ineffective, and means associated with said timing mechanism for reclosing said normally closed switch means a predetermined time after said resetting.

4. In an off-peak control system for an electric load circuit, the combination with a conventional electrically driven manually resettable clock, of gear means driven by said clock and forming in conjunction therewith a synchronously driven and simultaneously resettable 24-hour gear train, means automatically operable upon reenergization of said clock following deenergization thereof for audibly indicating that a stoppage of said clock has occurred, means responsive to resetting of said clock and gear train for disabling said indicating means, means associated with said gear train and visible on the face of said clock for indicating in which of two 12-hour periods said gear train is operating, and timing mechanism driven by said gear train including switch means operable between on-position and off-position at a plurality of selected intervals during each 24-hour cycle for controlling said load circuit.

5. In an off-peak control system for an electric load circuit, the combination with a conventional electrically driven manually resettable clock, of gear means driven by said clock and forming in conjunction therewith a synchronously driven and simultaneously resettable 24-hour gear train, means automatically operable upon reenergization of said clock following deenergization thereof for audibly indicating that a stoppage of said clock has occurred, means responsive to resetting of said clock and gear train for disabling said indicating means, means associated with said gear train and visible on the face of said clock for indicating in which of two 12-hour periods said gear train is operating, timing mechanism driven by said gear train including switch means operable between on-position and off-position at selected intervals during each 24-hour cycle for controlling said load circuit, and means effective upon each resetting of said clock and gear train for preventing energization of said load circuit by operation of said switch means for a predetermined time interval following said resetting.

6. In a control system for an electric load circuit, the combination with a conventional electrically driven clock having a manually operable resetting member, of gear means driven by said clock and forming in conjunction therewith a synchronously driven and simultaneously resettable 24-hour gear train, a timing member driven by said gear train and including a plurality of adjustable switch-operating portions thereon, and switch means operable at a plurality of selected and variable intervals by said portions for energizing and deenergizing said load circuit.

7. In a control system for an electric load circuit, the combination with a conventional electrically driven clock having a manually operable resetting member, of gear means driven by said clock and forming in conjunction therewith a synchronously driven and simultaneously resettable 24-hour gear train, means associated with said gear train and visible on the face of said clock for continuously indicating in which of two 12-hour periods said gear train is operating, a timing member driven by said gear train and including a rotatable disc, a plurality of adjustable switch-operating portions selectively positionable on said disc, and switch means operable at a plurality of selected and variable intervals by said portions for energizing and deenergizing said load circuit.

8. In an off-peak control system for an electric load circuit, the combination with a conventional electrically driven clock having a manually operable resetting member, of gear means driven by said clock and forming in conjunction therewith a synchronously driven and simultaneously resettable 24-hour gear train, a timing member driven by said gear train and including adjustable switch-operating portions thereon, switch means operable at selected intervals by said portions for energizing and deenergizing said load circuit, and means rendered effective by operation of said resetting member for preventing energization of said load circuit by said switch means for a predetermined time interval following a resetting operation.

9. In an off-peak control system for an electric load circuit, the combination with a conventional electrically driven clock having a manually operable resetting member, of gear means driven by said clock and forming in conjunction therewith a synchronously driven and simultaneously resettable 24-hour gear train, a timing member driven by said gear train and including adjustable switch-operating portions thereon, switch means operable at selected intervals by said portions for energizing and deenergizing said load circuit, means responsive to operation of said resetting member for preventing energization of said load circuit by said switch means, and means operated by said gear train for disabling said preventing means a predetermined time interval after a resetting operation.

10. In an off-peak control system for an electric load circuit, the combination with a conventional electrically driven clock having a manually operable resetting member, of gear means driven by said clock and forming in conjunction therewith a synchronously driven and simultaneously resettable 24-hour gear train, a timing member driven by said gear train and including adjustable switch-operating portions thereon, switch means operable at selected intervals by said portions for energizing and deenergizing said load circuit, second switch means connected in series with said first mentioned switch means for controlling said load circuit, means operable by said resetting member for opening said second switch means to render said first switch means ineffective to energize said load circuit, and means operated by said gear train for closing said second switch means a predetermined time interval after a resetting operation to render said first switch means again effective to energize said load circuit.

11. In an off-peak control system for an electric load circuit, the combination with a conventional clock having a manually operable resetting member and a driving motor including a field magnet, of timing mechanism driven by said motor in synchronism with said clock and adapted to be reset by said resetting member simultaneously with said clock, switch means operable by said timing mechanism to effect on-off control of said load circuit, and audible alarm means for indicating a restoration of electrical service after an interruption thereof, said alarm means comprising a pivoted vibrator member adapted to be magnetically held inactive by said field magnet when in one position and to be magnetically vibrated by said field magnet when in a second position, said vibrator member being movable to said one position by said resetting member and being automatically movable to said second position upon deenergization of said field magnet.

12. In an off-peak control system for an electric load circuit, the combination with a conventional clock having a manually operable resetting member and a driving motor including a field magnet, of timing mechanism driven by said motor in synchronism with said clock and adapted to be reset by said resetting member simultaneously with said clock, switch means operable by said timing mechanism to effect on-off control of said load circuit, and audible alarm means for indicating a restoration of electrical service after an interruption thereof, said alarm means comprising a vibrator member pivoted intermediate its ends having one end portion adapted to be magnetically held by said field magnet to render said vibrator member inactive when in one position and having a second end portion adapted to be magnetically vibrated by said field magnet when said vibrator member is in a second position, said vibrator member being movable to said one position by said resetting member and being automatically movable to said second position upon deenergization of said field magnet.

13. The combination with a conventional electrically driven manually resettable clock, of timing mechanism driven by said clock, a control member operable between on and off positions by said timing mechanism to effect a control function, and means rendered effective by resetting of said clock to prevent said control member from effecting said control function for a predetermined time interval following a resetting operation.

14. The combination with a conventional electrically driven manually resettable clock, of timing mechanism driven by said clock, a control member operable between on and off positions by said timing mechanism to effect a control function, means operable upon manual resetting of said clock for preventing exercise of said control function by said control member, and means driven by said clock for disabling said preventing means a predetermined time after a resetting operation.

15. The combination with a conventional electrically driven manually resettable clock, of timing mechanism driven by said clock, first switch means periodically operable between on and off positions by said timing means to effect a timed control function, second switch means connected in series with said first switch means, and means rendered effective by resetting of said clock for opening said second switch means and maintaining said second switch means open for a predetermined time interval after a resetting operation, thereby rendering said first switch means ineffective during said time interval.

16. The combination with a conventional electrically driven manually resettable clock, of timing mechanism driven by said clock, first switch means periodically operable between on and off positions by said timing means to effect a timed control function, second switch means connected in series with said first switch means, means operable upon manual resetting of said clock for opening said second switch means to prevent said first switch means from effecting said control function, and means driven by said clock for closing said second switch means a predetermined time after a resetting operation again to render said first switch means effective.

17. A time control mechanism comprising a conventional clock of the type having clock hands movable over the usual clock face by an electrically driven manually resettable clock mechanism, a casing enclosing said clock mechanism, a reset member for said clock mechanism extending outwardly of said casing, gear means within said casing forming in conjunction with said clock mechanism a 24-hour gear train synchronously driven and simultaneously resettable with said clock mechanism, a timing element driven by said gear train, a control member operable between two control positions and a plurality of adjustable operating members carried by said timing element for operating said control member between said two control positions at a plurality of predetermined intervals during each 24-hour cycle.

ROBERT L. DAUGHERTY.

REFERENCES CITED

The following references are of record in the file of this patent:

UNITED STATES PATENTS

| Number | Name | Date |
|---|---|---|
| 1,371,935 | Rubin | Mar. 15, 1921 |
| 1,860,159 | Porter | May 24, 1932 |
| 2,063,076 | Balzer | Dec. 8, 1936 |